Oct. 26, 1965  TOMOKICHI TANGO ETAL  3,214,681
THREE-PHASE FERRO-RESONANCE TYPE VOLTAGE REGULATING DEVICE
Filed June 5, 1962  4 Sheets-Sheet 1

INVENTORS
Tomokichi Tango
Hiroshi Kobayashi
Takeshi Anayama
Eijiro Miyazawa

By Wenderoth, Lind & Ponack
attorneys (a)

(b)

Oct. 26, 1965    TOMOKICHI TANGO ETAL    3,214,681
THREE-PHASE FERRO-RESONANCE TYPE VOLTAGE REGULATING DEVICE
Filed June 5, 1962    4 Sheets-Sheet 3

INVENTOR.
Tomokichi Tango
Hiroshi Kobayashi
Takeshi Anayama
Eijiro Miyazawa

By Wenderoth, Lind & Ponack
attorneys

Oct. 26, 1965  TOMOKICHI TANGO ETAL  3,214,681
THREE-PHASE FERRO-RESONANCE TYPE VOLTAGE REGULATING DEVICE
Filed June 5, 1962  4 Sheets-Sheet 4

INVENTORS
Tomokichi Tango
Hiroshi Kobayashi
Takeshi Anayama
Eijiro Miyazawa

United States Patent Office 3,214,681
Patented Oct. 26, 1965

3,214,681
THREE-PHASE FERRO-RESONANCE TYPE
VOLTAGE REGULATING DEVICE
Tomokichi Tango, Fujisawa, Hiroshi Kobayashi, Kawasaki, Takeshi Anayama, Nagamachi, Sendai, and Eijiro Miyazawa, Mitaka, Tokyo, Japan, assignors to Yawata Iron & Steel Co., Ltd., a corporation of Japan
Filed June 5, 1962, Ser. No. 200,158
Claims priority, application Japan, July 20, 1961, 36/25,637
1 Claim. (Cl. 323—76)

This invention relates to a three-phase ferro-resonance type voltage regulating device. More particularly the present invention relates to a three-phase ferro-resonance type voltage regulating device wherein three-phase saturable reactors having a three-leg type core are used in a part of its circuit, characterized in that the cross-sectional area of a part of each leg of said three-leg type core of the three-phase saturable reactors is made smaller than that of the remaining part.

An object of the present invention is to improve the performance of a three-phase ferro-resonance type voltage regulating device.

In the drawings, FIGURE 1 is a schematic representation of a circuit arrangement for a three-phase ferro-resonance type voltage regulating device.

Figure 1:
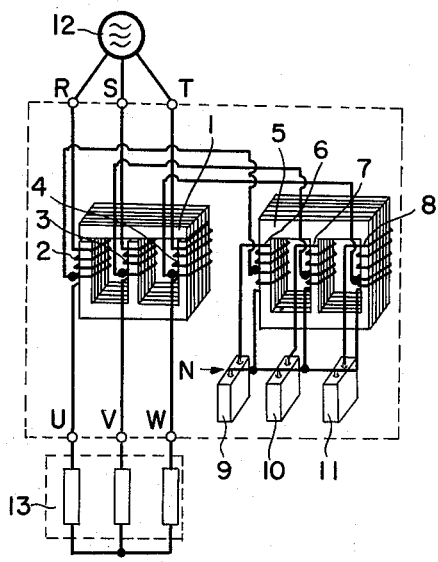

In FIGURE 1, which shows an example of a circuit arrangement for a three-phase ferro-resonance type voltage regulating device, 1 is a core for the linear reactors, 2, 3 and 4 are windings of the linear reactors of phases R, S and T, respectively, 5 is a core for the saturable reactors, 6, 7 and 8 are windings of the saturable reactors of phases R, S and T, respectively, and 9, 10 and 11 are condensers connected in parallel with the windings 6, 7 and 8 of the saturable reactors, respectively and forming with the windings 6, 7 and 8 resonant circuits which resonate at a fundamental frequency. When a three-phase alternating voltage source 12 is connected to the terminals of the phases R, S and T of this device and loads 13 are connected to the terminals U, V and W, even if the source voltage varies, the terminal voltage across the load will not substantially vary.

As the circuit shown in FIGURE 1 can be considered as if it is a combination of three of the single-phase ferro-resonance circuits shown in FIGURE 2, the principle which causes the output voltage of the circuit shown in FIGURE 1 to be constant will be explained in connection with the single-phase circuit shown in FIGURE 2.

Figure 2:
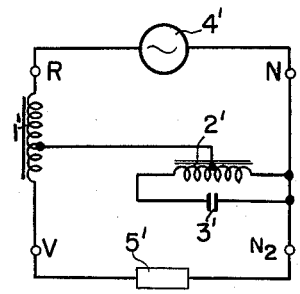
FIGURE 2 is a circuit diagram of a single-phase ferro-resonance circuit.

In the circuit shown in FIGURE 2, 1' is a linear reactor, 2' is a saturable reactor, 3' is a parallel-resonance condenser, 4' is an alternating current voltage source and 5' is a load. The reason why the terminal voltage across the load in this circuit is substantially constant independent of the variation of the source voltage is as follows. If the source voltage rises, the voltage applied to the saturable reactor 2' will rise and therefore the exciting current of the saturable reactor will income sharply. Thus a lagging current will flow through the linear reactor 1' and induce a voltage drop in the linear reactor 1'. As a result, the voltage between the terminals V and $N_2$ on the load side will be kept substantially constant. Now, when the source voltage drops, the exciting current in the saturable reactor 2' will decrease. Therefore, in the linear reactor 1', a leading current caused by the condenser will flow, and induce a voltage rise in the linear reactor 1', and the terminal voltage across the load will be kept substantially constant. It is thus understood that the terminal voltage across the load will be kept substantially constant independent of the variation of the source voltage. The circuit shown in FIGURE 1 is made by combining three of the circuits shown in FIGURE 2 and connecting together the three terminals denoted $N_2$ in FIGURE 2 to a floating neutral point N in FIG. 1.

The foregoing is the explanation of why the output voltage of the operation of the three-phase ferro-resonance type voltage regulating device shown in FIGURE 1 is constant. In order to explain a second feature of the present invention, the wave forms of the current and voltage in the respective portions of the circuit shown in FIGURE 1 shall be further considered.

It is a well known fact that, in a single-phase ferro-resonance type voltage regulating device, the output wave form is greatly distorted. As the device shown in FIGURE 1 is also ferro-resonance type voltage regulating device, it might be thought that the output wave form will be distorted. However, in the device in FIGURE 1, the output wave form can be made to be substantially distortionless by utilizing the three-phase circuit. The reason therefor shall be explained in the following.

The output wave form of the single-phase ferro-resonance device will be distorted because the exciting current of the saturable reactor 2 in FIG. 2 contains higher harmonic components due to the non-linear magnetization characteristics of the core. Therefore, if the wave form of the exciting current of the saturable recator can be made to be sinuosidal by some means, the wave form of the output voltage will become sinusoidal. In the three-phase ferro-resonance type voltage regulating device in FIGURE 1, the wave forms of the exciting currents of the saturable reactors 6, 7 and 8 can be made to be sinusoidal for the following reasons.

Figure 3:
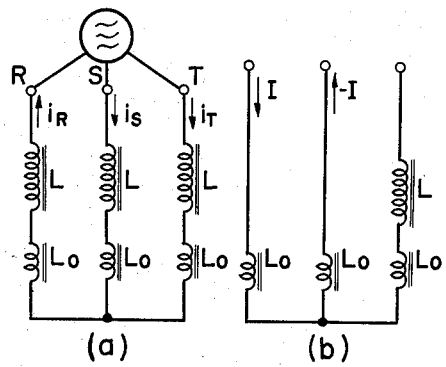
FIGURES 3 to 10 are views explaining a principle which explains that the wave-form of the output voltage of the device illustrated in FIGURE 1 is sinusoidal.
Figure 4:
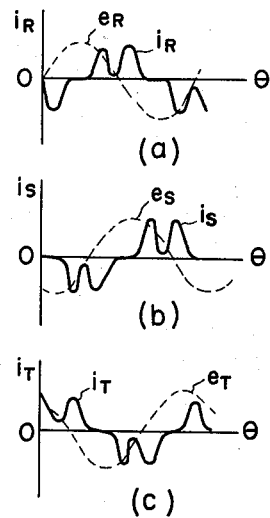

First of all, let the exciting current flowing in the circuit shown in FIG. 3 be considered, in which three indepedent saturable reactors L are inserted in respective phases and their residual inductances at the time of saturation are represented by Lo and are shown as separate inductances so as to be easily understood. When only one saturable reactor in some phase is saturated, substantially no current will flow. But when the two saturable reactors in two phases are both saturated as shown in (b) of FIGURE 3, a large current will flow. Therefore, there will be a third phase remaining unsaturated through which substantially no curernt will flow. Therefore, the exciting currents $i_R$, $i_S$ and $i_T$ will be as in (a), (b) and (c) of FIGURE 4, respectively.

Figure 5:
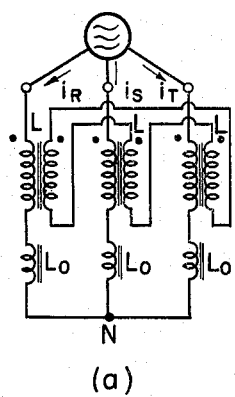
Figure 5:
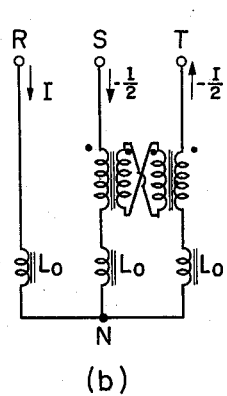

In the second place, let the exciting current flowing in the circuit shown in FIG. 5 be considered in which secondary windings are provided for the respective saturable reactors and are connected in a delta. When the reactor of the phase R is saturated, the circuit becomes equivalent to the circuit shown in (b) of FIGURE 5 and the exciting current $i_R + I$, $$i_S = -\frac{I}{2}$$

and $$i_T = -\frac{I}{2}$$

Figure 6:
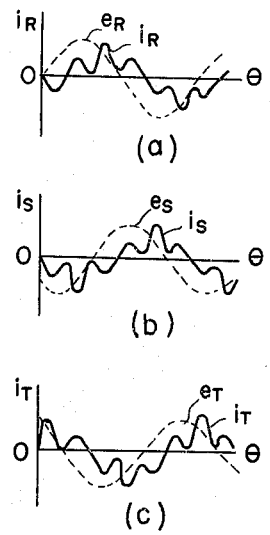

Therefore, the exciting currents of the respective phases in such case will be as in (a) to (c) of FIGURE 6.

Figure 7:
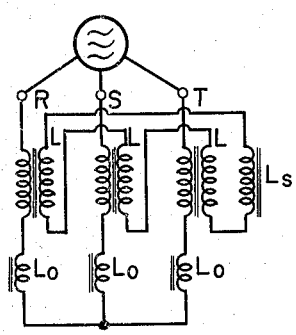
Figure 8:
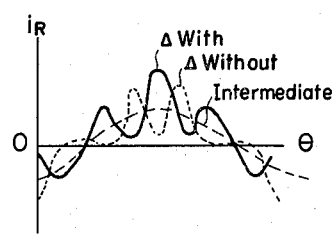

Therefore, if a proper series inductance Ls is inserted in the delta-connected circuit of the secondary windings as in FIGURE 7, an intermediate condition between above two cases can be obtained, and there is obtained intermediate exciting current as shown in FIG. 8, which has a substantially sinusoidal wave form.

Figure 9:
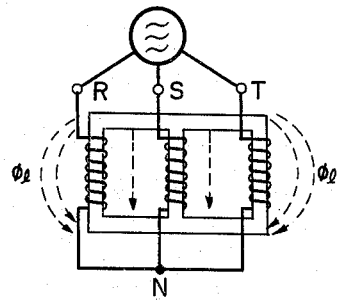

In a practical device, such as a three-leg core structure having proper leakage flux $\phi l$ as shown in FIGURE 9 is used instead of providing the secondary windings and inserting the series inductance Ls in the delta connected circuit. Because the three-leg core structure will be the same as in (a) of FIGURE 5 if there is no leakage magnetic flux $\phi l$ and will be the same as in FIGURE 7 if there is leakage $\phi l$. Thus by designing the circuit to have a proper value of $\phi l$, the exciting current of each phase can be made to be substantially sinusoidal.

Figure 10:
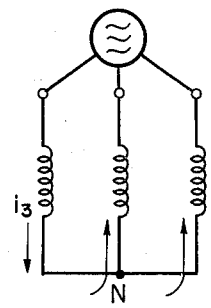

As understood from the above explanation, the wave form of the exciting current of the saturable reactor becomes substantially sinusoidal, but this will occur only when the phase voltages of the saturable reactors 6, 7 and 8 have exactly the same amplitude. However when there is some unbalance in voltage source, i.e., when one phase voltage is higher than other two phases, the third harmonic current will flow in the saturable reactors, as shown by $i_3$ in FIGURE 10. In such case, the wave form of the exciting current of each phase can not be sinusoidal as represented by the dotted line in FIGURE 8. Thus, if the exciting current is distorted, a greater distortion will be produced in the voltage drop caused thereby in the linear reactor. Therefore, the terminal voltage across the load will be also greatly distorted.

Figure 11:
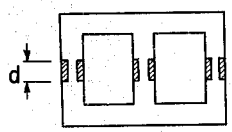
FIGURE 11 is an elevation view of the core used for the three type saturable reactor shown in FIG. 1.
Figure 12:
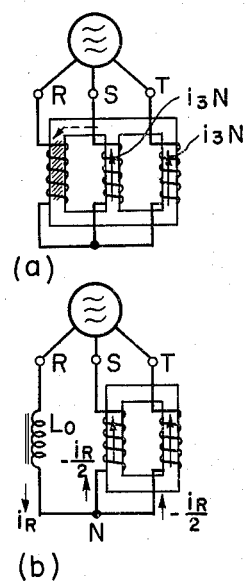
FIGURES 12 to 14 are views explaining the principle of the embodiment of the present invention shown in FIGURE 1.
Figure 13:
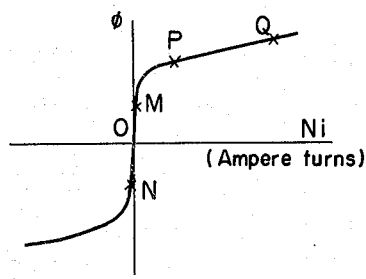

The present invention seeks to eliminate such defects. According to the present invention, each leg of the core of a three-leg type saturable reactor in a three-phase ferro-resonance circuit exemplified in FIGURE 1 has a part with a smaller cross section than the cross section of the remainder of the leg as shown by hatchings in FIGURE 11 and the length of the part with the smaller cross-section and the amount of reduction of the cross-section are chosen so that the above described troubles due to the third harmonics can be substantially elminated by the ingenious principle described hereinafter. At first, let the equivalent impedance of saturable reactors for the third harmonic currents be considered. When only one core of the reactors, for example, in the phase R as shown in FIG. 12 (a), is saturated as shown by P to Q in FIG. 13, the equivalent circuit in such case is as in (b) of FIGURE 12, and the current $i_R$ of the phase R will be divided into halves and flow through the phases S and T. As the third harmonic current flows through the windings of the reactors of the phases S and T in the same phase, the ampere turns $i_3 N$ in both phases caused by such third harmonic current will be produced in the direction shown by the arrow in (a) of FIGURE 12 and both magnetic fluxes caused by them must flow through the R phase leg. Therefore, as far as such third harmonic current is concerned, the reactors in both S and T phases act as if they were in the saturated state as shown by P and Q in FIGURE 13. And thus the inductance of the reactor for the third harmonics of each phase is determined by the saturated state as shown by P to Q in FIG. 13.

Figure 14:
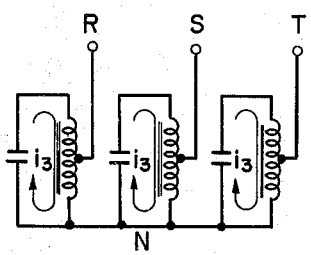

When the said inductance of the reactor for the third harmonics is so selected as to resonate at the third harmonic frequency with the condenser connected in parallel with the said reactor as shown in FIG. 14, the third harmonic currents caused by the source voltage unbalance circulate within the said resonating reactor and condenser, and do not flow out of the tank circuits. Therefore, said third harmonic currents do not effect the voltage drop in the linear reactors or the output terminal voltages.

In order to make the inductance of the reactor for the third harmonics have a value such that it resonates with the condenser as stated above, the inclination of the saturated portion P to Q of the magnetization curve must be a fixed one determined by the capacitance of the condenser and number of turns of the saturable reactor, and must be such that the inclination does not coincide with the inclination inherent in the core material in general. To change the inclination to the desired one, a part of each leg of the saturable reactor core is made smaller in its cross sectional area than the cross sectional area of the remainder of the leg.

The said construction and its function are the principal features of the present invention and enable us to obtain a three-phase ferro-resonance type voltage regulating device having good sinusoidal wave form and performing well even when supplied from an unbalanced voltage source.

We claim:

A three-phase ferro-resonance type voltage regulating device, comprising three linear reactors adapted to be inserted between three input terminals of a three-phase alternating voltage source and three load terminals respectively, a tap on each of the windings of said linear reactors intermediate the ends of the respective reactor on which the tap is located, a three-leg magnetic core, each leg of which has a part with a smaller cross-section than the cross-section of the remainder of the leg, three saturable reactors, one of each leg of said three-leg magnetic core, and three condensers, the windings of said three saturable reactors being connected in parallel with the three condensers respectively with each reactor and condenser together forming a ferro-resonance tank circuit resonant at the frequency of the source voltage, the respective one ends of the tank circuits being Y-connected and the other ends being connected to said taps on the windings of the respective linear reactors, whereby the output voltage at the load terminals is kept constant, and the wave form of the output voltage is substantially sinusoidal.

References Cited by the Examiner

UNITED STATES PATENTS

| | | | |
|---|---|---|---|
| 513,425 | 1/94 | Scott | 336—155 |
| 1,260,743 | 3/18 | Attila | 336—212 |
| 1,344,713 | 6/20 | Peters | 336—155 X |
| 1,635,064 | 7/27 | Wagner | 336—210 X |
| 1,979,699 | 11/34 | Maslin | 336—155 X |
| 2,377,152 | 5/45 | Huge | 307—13 |
| 3,162,800 | 12/64 | Friedlander et al. | 323—60 |

LLOYD McCOLLUM, *Primary Examiner.*

ELI J. SAX, *Examiner.*